United States Patent [19]

West

[11] Patent Number: 4,697,686
[45] Date of Patent: Oct. 6, 1987

[54] GATE FOR SPLITTING A FLOW OF GRANULAR MATERIAL

[75] Inventor: Henrik West, Copenhagen, Denmark
[73] Assignee: F. L. Smidth & Co. A/S, Denmark
[21] Appl. No.: 639,681
[22] Filed: Aug. 9, 1984
[30] Foreign Application Priority Data
Aug. 12, 1983 [GB] United Kingdom ............... 8321732
[51] Int. Cl.[4] .................. B65G 11/00; B65G 11/20
[52] U.S. Cl. .................................. 193/23; 193/29; 193/31 A
[58] Field of Search ............... 193/23, 29, 31 A, 31 R
[56] References Cited

U.S. PATENT DOCUMENTS

| 193,695 | 7/1877 | Drake | 193/23 |
|---|---|---|---|
| 1,038,957 | 9/1912 | Pritchett | 193/31 A |
| 2,436,624 | 2/1948 | Volk | 193/31 A |
| 3,926,289 | 12/1975 | Yoshioka et al. | 193/23 |
| 4,159,053 | 6/1979 | Taylor | 193/23 |
| 4,302,110 | 11/1981 | Niemi | 193/23 |

Primary Examiner—Andres Kashnikow
Assistant Examiner—Patrick N. Burkhart
Attorney, Agent, or Firm—Brumbaugh, Graves, Donohue & Raymond

[57] ABSTRACT

A gate for adjustably splitting a flow of granular material comprises an inlet pipe (1) which discharges onto a pivotal baffle plate (5) in an intermediate piece (2) overlying a circular plate which is formed with openings leading through respective hoppers (3) to respective ones of two or more outlet pipes (4). The baffle plate spreads the flow of material and pivoting of the baffle on a vertical shaft (6) adjusts the discharge of material through the various openings.

7 Claims, 6 Drawing Figures

GATE FOR SPLITTING A FLOW OF GRANULAR MATERIAL

The present invention relates to a splitting gate for dividing, in an adjustable manner, a flow of granular material into at least two material flows.

Attempts to obtain such material flow division have been made in various ways by means of throttle valves, which, mounted immediately above a branching of a pipe conveying the material flow, could be used for barring either branch to a greater or lesser extent. In this case the division is extremely dependant upon how the material flow hits a front edge of the throttle valve.

It has also been tried to achieve the division by using a gate of the kind, hereinafter referred to as of the kind described, comprising an inlet pipe and two or more outlet pipes, the outlet pipes each leading downwards from a respective opening in a substantially horizontal and substantially circular surface, and adjacent openings being separated by a respective strip in the surface; and an inatermediate piece, between the inlet pipe and the surface, forming a closed passage, which is coupled at one end to the inlet pipe, and which, at the other end, discharges over at least part of one or more of the openings in the circular surface. In such prior gate, the intermediate piece has terminated in a plate which is concentric with and covers the surface in such a way that the opening of the passage is aligned with at least part of one or more openings in the surface.

The latter construction has been developed as a change-gate which by means of a pivotal intermediate piece can establish connection between the inlet pipe and one of the openings in the surface. It has been tried to achieve an adjustable division of the material flow by using intermediate positions, in which the opening of the intermediate piece is aligned with a smaller or larger part of several openings in the surface.

However, the course of a material flow in a pipe, particularly in the case of the material outlet from a separating cyclone, is extremely erratic, as the material is not evenly distributed across the cross-section of the pipe, but flows as a material jet running onto changing positions at the periphery of the pipe. Consequently, it is somewhat haphazard into which opening the material at the lower opening of the intermediate piece flows down, or whether a material division takes place between the openings; and the division ratio will also be haphazard and varying.

Consequently, it is the object of the invention to devise a splitting gate by which the abovementioned disadvantages are minimized, so that the material division ratio becomes a unique function of the setting of the splitting gate.

The object is achieved by a gate of the kind described which is characterized in that the axis of the inlet pipe is in a vertical plane intersecting, along a diameter, the circular surface in which the openings are provided, preferably along a strip separating two adjacent openings, and in that there is a substantially plane pivotal baffle plate in the intermediate piece, the plate being pivotal about a vertical axis and the plane of the plate intersecting the surface along a chord and being inclined to the axis of the inlet pipe so that material discharged from the inlet pipe impinges on the plate. In a special case, the chord may be a diameter of the surface.

The baffle plate spreads the material flow so that, at the lower edge of the plate, which is a chord along the circular surface, it runs as a broad, flat, even flow which is divided by the strips between the outlet openings. When the chord is in a position perpendicular to a strip, the openings at each side of the strip are each supplied with half of the material. By turning the plate, i.e. by offsetting the chord around the arc of the circle, this ratio can be altered continuously until all material is passed to one or the other opening.

The inlet pipe may have an inclined position so that its axis forms an angle of between 45° and 90° with the horizontal, still maintaining, however, its position in a vertical plane intersecting the surface along a diameter and particularly along a strip between two outlet openings. In this way the helical, uneven flow, which the material in the material outlet of a cyclone often performs, is dissipated. To obtain this effect the inclined pipe must have a certain length dependant upon the inclination of the pipe. Experiments have shown that a length 3 times that of the diameter of the pipe is sufficient at an inclination of 60°.

The inflowing material may either hit the baffle plate in such a way that the horizontal kinetic component of the material alters direction, which is called a counter-flow solution, or the material may pass across the baffle plate substantially without changing direction of movement in the horizontal direction, which is called a co-current solution. To render the co-current solution feasible, the angle which the baffle plate forms with the horizontal must be smaller than the inclination of the axis of the inlet pipe.

In a preferred construction, the baffle plate may constitute part of the wall of the intermediate piece, which is then arranged to pivot about a vertical axis through the circular surface, and which at its upper end is coupled to the inlet pipe and which at its lower end, may open into a circular plate which covers, and is concentric with, the circular surface.

The invention will now be explained in more detail, with reference to the accompanying drawings, in which.

Figure 1:
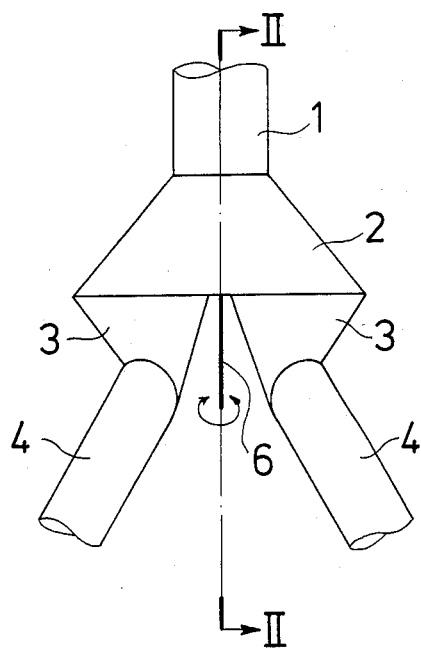
FIG. 1 is a front view of one example of a splitting gate according to the invention.
Figure 2:
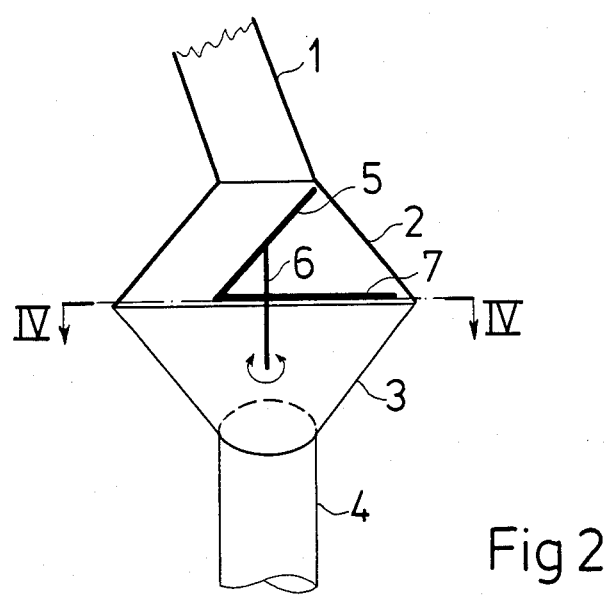
FIG. 2 is a diagrammatical vertical section taken on the line II—II in FIG. 1.

FIG. 1 shows an inlet pipe 1 coupled to the upper part of a conical intermediate piece 2, the lower part of which encircles a substantially horizontal surface 11 (shown in FIG. 4) which, by strip 9 (also shown in FIG. 4) of the surface in the plane of the drawing, is divided into two openings each of which, through a respective outlet hopper 3, communicates with an outlet pipe 4. Inside the intermediate piece as shown in FIG. 2 there is a baffle plate 5 which forms an angle with the horizontal plane, and which in the position shown is perpendicular to the plane of the drawing. The baffle plate is mounted on a vertical shaft 6 extending through the centre of the circular surface, by means of which shaft the baffle plate is pivotal i.e. rotatable. A cover plate 7, which apart from a segment of a circle delimited by the edge of the baffle plate in the horizontal plane, covers the surface and is connected to the baffle plate so as to pivot together with it. The cover plate covers the openings in the surface behind the baffle plate, but apart from that it is not in this example absolutely necessary for the functioning of the gate.

Figure 3:
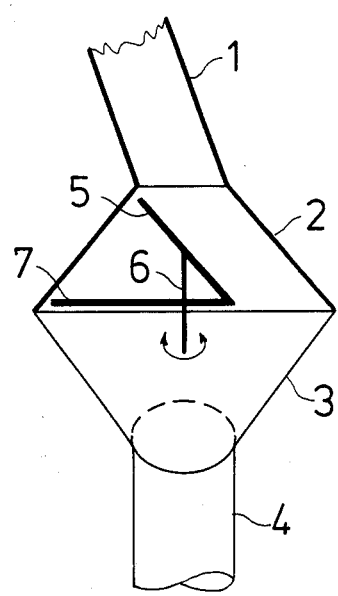
FIG. 3 is the section shown in FIG. 2 with the baffle plate shown in another position.

FIG. 3 shows the splitting gate as shown in FIG. 2 but with the baffle plate turned 180°. It is a prerequisite for the functioning of the gate in this position that the angle which the baffle plate forms with the horizontal is at least 5–10° smaller than the angle which the inlet pipe forms with the horizontal.

Figure 4:
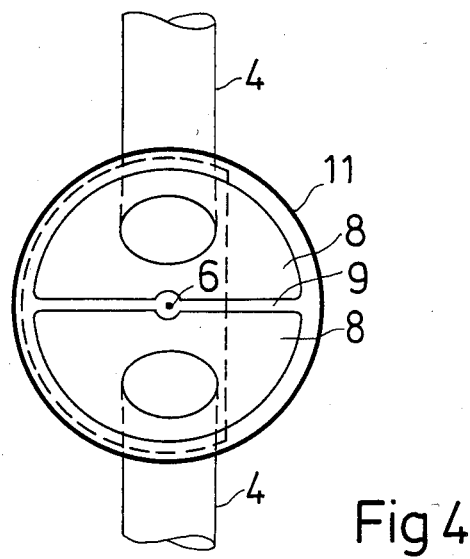
FIG. 4 is a top view, as seen from the line IV—IV in FIG. 2, of the lower part of the splitting gate.

As shown in FIG. 4, the circular surface has two openings 8 which are delimited by the outer edge of the outlet hoppers 3 connecting the respective openings with each separate outlet pipe 4. The openings are separated by the diametrical strip 9, which is an edge common to the two outlet hoppers 3. The shaft 6 for pivoting the baffle plate passes through the centre of the surface and can be operated from outside from the space between the outlet hoppers. The dotted line, which indicates the cover plate 7, also shows the lower edge of the baffle plate. In the position shown material evenly distributed across the baffle plate will be distributed evenly on the two openings 8. Upon pivoting of the baffle plate, by means of the shaft 6, a larger part of the chord formed by the edge of the baffle plate will lie above one opening than above the other, and the division ratio of the material will alter accordingly. It is seen that a pivoting of less than 90° is required before all the material is passed to one of the outler hoppers. Experiments show that the division ratio in a wide interval around the centre position changes linearly with the angle of pivoting.

Figure 5:
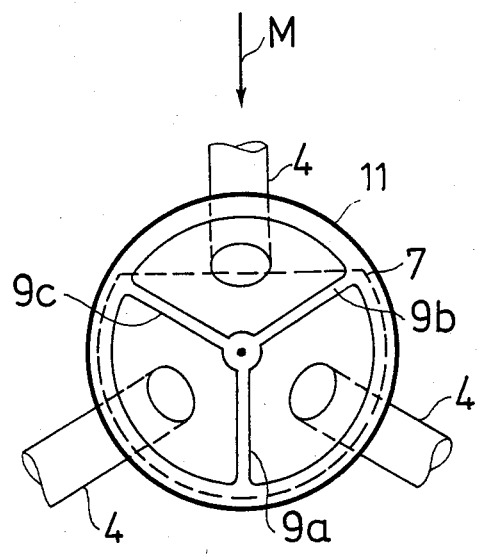
FIG.5 is a top view of the lower part of a second example of a splitting gate according to the invention with three material outlets; and, FIG. 6 is a section similar to FIG. 2 but of a third example of a splitting gate according to the invention.

FIG. 5 diagrammatically shows the bottom part of a splitting gate with three outlet pipes corresponding to three outlet openings into which the surface 11 is divided by the strips 9a, 9b, and 9c. The position of the baffle plate is shown by indication of the cover plate 7. In the position shown of the baffle plate, and when the material is introduced through an inlet pipe (not shown) and thereby is given a horizontal component in the direction shown by the arrow M, a counter-flow solution is established, according to which all inflowing material is led to the opening and outlet hopper delimited by the edges 9b and 9c.

A division of the material flow between the other two openings is achieved by pivoting the baffle plate 180°, the division taking place across the edge 9a in a co-current solution.

A material division can also take place across the strips 9b and 9c, although it is preferred to let the division take place across a strip which is in the same plane as the material inlet pipe.

Arrangements in which material division takes place simultaneously across several strips may also be considered. Such a construction, however, puts limits to the possibility of varying freely the interrelationships between the outlet material flows.

Figure 6:
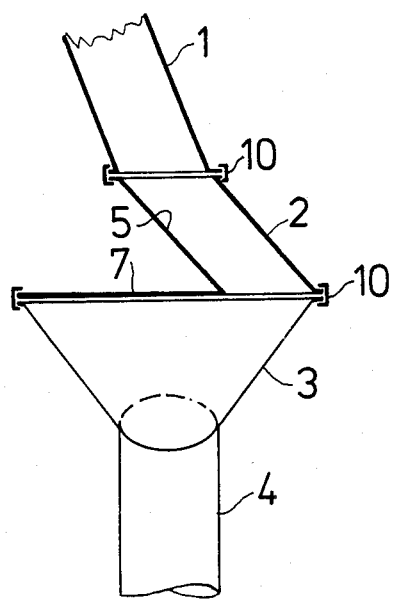

FIG. 6 shows a construction in which the baffle plate 5 constitutes a wall of the intermediate piece 2, which consequently is delimited by a truncated-cone-shaped surface and a plane surface. In this arrangement the presence of the cover plate 7 is indispensable, as it guards against false draught through the part of the openings in the circular surface which is behind the baffle plate. The intermediate piece, comprising the baffle plate and the cover plate, forms at the bottom a circular construction covering, and concentric with, the circular surface, and, at the top, has a circular opening aligned with the inlet pipe, the centre of which lies on a vertical line through the centre of the circular surface. Around and along the annular connections of the intermediate piece with the circular surface 11 and with the inlet pipe 1, are provided seals 10. The entire intermediate piece, inclusive of the wall which forms the baffle plate, may consequently be pivoted about an axis through the centres of the annular connections.

In the examples shown, the baffle plate is in an inclined position but also constructions with the baffle plate in a vertical orientation are possible. Furthermore the axis of the inlet pipe may in practice fall outside the vertical plane through a strip 9. Similar, the strip does not necessarily have to be equally broad in its entire length, but may be a partition between e.g. two circular openings, the direction of the strip being defined as the direction perpendicular to the connecting line between the centres of the openings.

I claim:

1. In a splitting gate for dividing in an adjustable manner a flow of granular material into at least two material flows, said gate comprising an inlet pipe and two or more outlet pipes, said outlet pipes each leading downwards from a respective opening in a substantially horizontal and substantially circular surface, and adjacent ones of said openings being separated by a respective strip in said surface; and an intermediate piece, between said inlet pipe and said surface, forming a closed passage which is coupled at one end of said inlet pipe, and which, at the other end, discharges over at least part of one or more of said openings in said circular surface, the improvement wherein the axis of said inlet pipe is in a vertical plane intersecting said circular surface along a diameter, and wherein there is a substantially plane baffle plate in said intermediate piece, said plate being pivotal about a vertical axis and the plane of said plate intersecting said surface along a chord and being inclined to said axis of said inlet pipe so that material discharged from said inlet pipe impinges on said plate, said plate during continuous operation thereby directing said flow of granular material such that it is divided into at least two material flows.

2. A splitting gate according to claim 1, wherein said vertical plane containing said axis of said inlet pipe contains one of said strips in said surface.

3. A splitting gate according to claim 1, wherein the angle which said axis of said inlet pipe forms with the horizontal is between 45° and 90°.

4. A splitting gate according to claim 1, wherein the angle which said baffle plate forms with the horizontal is between 45° and 90°.

5. A splitting gate according to claim 1, wherein the angle which said baffle plate forms with the horizontal is smaller than the angle which said axis of said inlet pipe forms with the horizontal.

6. A splitting gate according to claim 1, wherein said baffle plate is part of said intermediate piece and said intermediate piece is pivotal about a vertical axis through the centre of said circular surface.

7. A splitting gate according to claim 1, wherein said baffle plate is fixed to a cover plate which covers the part of said surface behind said baffle plate.

* * * * *